United States Patent [19]

Yamaguchi et al.

[11] 4,414,840

[45] Nov. 15, 1983

[54] KNOCK DETECTING APPARATUS FOR INTERNAL COMBUSTION ENGINES

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 235,986

[22] Filed: Feb. 19, 1981

[30] Foreign Application Priority Data

Feb. 22, 1980 [JP] Japan ................................. 55-21770
Sep. 19, 1980 [JP] Japan ............................... 55-130965

[51] Int. Cl.³ ............................................. G01L 23/22
[52] U.S. Cl. ........................................ 73/35; 73/654
[58] Field of Search ............... 73/35, 651, 654, 658, 73/660, 702, 517 R, 652; 123/425, 435; 310/329

[56] References Cited

U.S. PATENT DOCUMENTS

| | | | |
|---|---|---|---|
| 2,275,675 | 3/1942 | Draper et al. ........................... | 73/35 |
| 2,702,883 | 2/1955 | Petroff et al. .......................... | 73/702 |
| 3,252,016 | 5/1966 | Hayer et al. .......................... | 310/329 |
| 3,422,311 | 1/1969 | Stanish ................................... | 73/651 |
| 4,051,395 | 9/1977 | Taylor .................................... | 310/329 |
| 4,255,965 | 3/1981 | Schulz et al. .......................... | 73/35 |

*Primary Examiner*—James J. Gill
*Attorney, Agent, or Firm*—Cushman, Darby & Cushman

[57] ABSTRACT

A knock detecting apparatus includes a vibrating member with a disk-shaped vibrating portion whose resonant point is in the knock frequency range. The outer peripheral edge of the vibrating member is held substantially over the entire periphery. The vibrating portion of the vibrating member may be provided with holes and an addition such as a protrusion and/or a ring-shaped rib portion so as to vary the natural frequency of the vibrating member. Also, the size and shape of the holes and the cross-sectional area of the addition and/or the diameter of the rib portion may be varied to adjust the natural frequency of the vibrating member.

8 Claims, 26 Drawing Figures

KNOCK DETECTING APPARATUS FOR INTERNAL COMBUSTION ENGINES

BACKGROUND OF THE INVENTION

This invention is related to co-pending U.S. application entitled "KNOCK DETECTING APPARATUS FOR INTERNAL COMBUSTION ENGINES" Ser. No. 178,282 filed on Aug. 15, 1980 in the names of the same inventors and assigned to the same assignee of this application.

The present invention relates to a knock detecting apparatus for use with engine ignition timing control apparatus, etc., which is designed to function such that the presence of knock is detected from the vibrations produced outside the engine cylinders due to the cylinder pressure and the ignition timing is controlled to obtain the desired knock intensity.

It is well known in the art that there is a close correlation between the ignition timing and the cylinder pressure.

When a mixture is exploded, in the absence of knock there occurs no superposition on the cylinder pressure of any higher harmonic components (usually those frequency components which fall in the range of 4 to 10 kHz and/or the range of 11 to 13 kHz and which are mainly determined by the engine cylinder bore diameter and the intermittent rapid combustion rate), whereas when knocking occurs the superposition of such higher harmonic components on the cylinder pressure begins to take place at around the maximum cylinder pressure and this results in the generation of vibrations or sounds outside the cylinders. A careful examination of the generating conditions of the pressure signals produced inside the cylinders or the vibrations or sounds produced outside the cylinders shows that the beginning of knock (or trace knock) starts to occur at an engine crank angle at which the cylinder pressure attains the maximum value. Then, as the knock increases in intensity gradually (to light knock and heavy knock), the higher harmonic components start to superpose on the cylinder pressure considerably earlier (or on the ignition side) than the maximum cylinder pressure crank angle. Thus, if the vibrations or sounds produced outside the cylinders by knocking are detected accurately and fed back to control the ignition timing, the engine efficiency will be improved considerably. However, presently no detecting apparatus have been developed which are capable of accurately detecting the presence of knock or a feedback factor and also capable of stably operating under such severe environmental conditions as required for vehicles.

Known knock detecting apparatus of the above kind include two types one of which employs a piezoelectric accelerometer which is usually used for vibration detecting purposes and whose frequency characteristic is higher than the knock frequencies and flat below the resonant point or frequency (this type is hereinafter referred to as a non-resonant type detecting apparatus). The other type employs a resonant detecting apparatus of the kind which has been investigated by the inventors, etc., and whose resonant characteristic is adjusted to the knock frequencies. Since the resonant point of the non-resonant type detecting apparatus is higher than the knock frequencies, the sensitivity of the apparatus is substantially constant in the lower frequency range including the knock frequencies lower than the resonant point. Thus, as a matter of principle, the apparatus is capable of detecting the presence of knock over the entire knock frequency range. However, when the engine is in operation, vibration noise such as one caused by the seating of the valves occurs frequently and the S/N ratio between the vibration noise and the knock is deteriorated, thus making it practically impossible for the non-resonant type detecting apparatus to detect the presence of knock at high engine speeds. Moreover, the detection sensitivity is low and the detection of weak knock is difficult even at low engine speeds.

In the case of the resonant type detecting apparatus, the detection sensitivity is improved considerably with respect to the particular frequencies around the resonant point and the superposition of vibration noise of other frequencies becomes difficult, thus greatly improving the S/N ratio and sensitivity with respect to knocking.

However, the resonant type detecting apparatus has many problems from the strength point of view due to the strong vibrations of the vibrating member at the resonant frequency and due to the application of the strong engine vibrations to the vibrating member, and the apparatus also has the disadvantage of the vibrating member being difficult to manufacture.

SUMMARY OF THE INVENTION

With a view to overcoming the foregoing deficiencies in the prior art, it is an object of this invention to provide an improved knock detecting apparatus of the resonant type in which the strength of a vibrating member is sufficiently high and the adjustment of resonant frequency and the manufacture of the vibrating member are easy.

The above object of this invention is preferably accomplished by an improved knock detecting apparatus in which a vibrating member includes a disk-shaped vibrating portion having a resonant point or frequency in the range of knock frequencies, and the outer peripheral portion of the vibrating member is practically entirely held or supported and/or the vibrating portion is formed with holes, an addition such as a protrusion or a rib portion which may be modified in shape and size in case of need.

These and other objects and many of the attendant advantages of this invention will be readily appreciated as the same becomes better understood by reference to the following detailed description when considered in connection with the accompanying drawings.

DESCRIPTION OF THE PREFERRED EMBODIMENTS

The present invention will now be described in greater detail with reference to the illustrated embodiments.

Figures 1, 2A, 2B, 3A, 3B, 4A, 4B, 5, 6A, 6B, 7A, 7B:
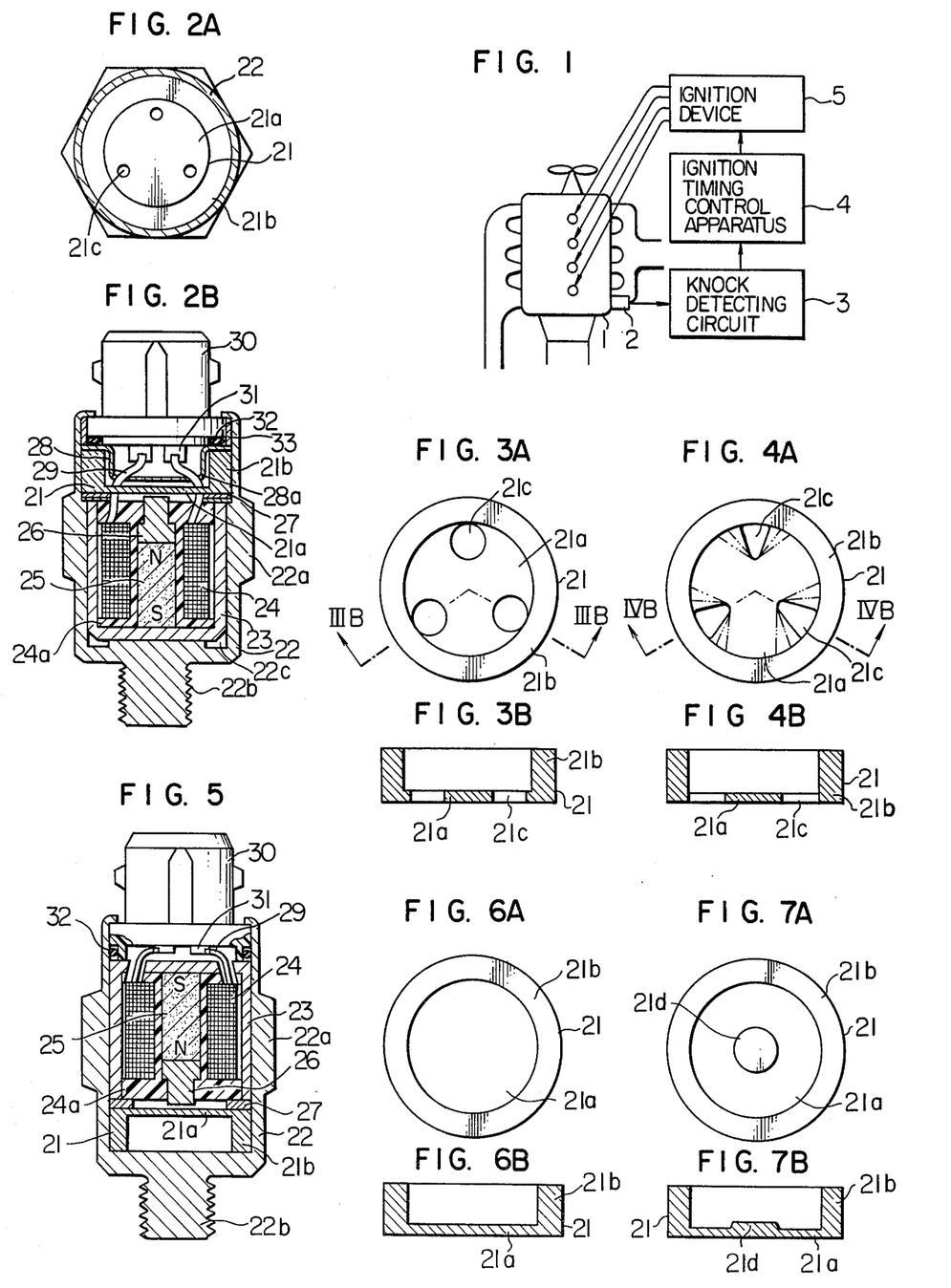
FIG. 1 is a schematic block diagram showing the construction of a knock feedback ignition system incorporating a knock detecting apparatus according to this invention.
FIGS. 2A and 2B are respectively a cross-sectional view and a longitudinal sectional view showing a first embodiment of the apparatus according to the invention.
FIGS. 3A and 3B and FIGS. 4A and 4B show other embodiments of the vibrating member 21 used in the detecting apparatus of FIG. 2, with FIG. 3A showing a front view of the first embodiment, FIG. 3B a longitudinal sectional view taken along the line IIIB—IIIB of FIG. 3A, FIG. 4A a front view of the second embodiment and FIG. 4B a longitudinal sectional view taken along the line IVB—IVB of FIG. 4A.
FIG. 5 is a longitudinal sectional view showing a second embodiment of the apparatus according to this invention.
FIGS. 6A and 6B and FIGS. 7A and 7B are respectively a front view and longitudinal sectional view of two embodiments of the vibrating member 21 used in the detecting apparatus shown in FIG. 5.

FIG. 1 is a schematic block diagram showing the construction of a knock feedback ignition system incorporating a knock detecting apparatus according to this invention. In the Figure, numeral 1 designates a four-cylinder in-line type internal combustion engine, and a knock detecting apparatus 2 is attached to the cylinder block of the engine 1 by means of a screw or the like. Numeral 3 designates a knock detecting circuit responsive to the output signal of the knock detecting apparatus 2 to detect the presence of knock, and 4 an ignition timing control apparatus responsive to the output of the detecting circuit 3 to advance or retard the ignition timing and control it at the optimum position. The output signal of the control apparatus 4 is used to ignite the mixture through a known type of ignition device 5 and the spark plugs mounted in the engine 1. The knock detecting circuit 3 used in this system detects the ignition signal which is not shown so that during a predetermined time interval or predetermined degrees of crankshaft rotation immediately following the ignition and having no occurrence of knock, the noise component due to the engine vibration is sampled by means of the output of the detecting apparatus 2 and compared with the sensor output generated during a predetermined time interval or crank angle after the top dead center or TDC (after the peak cylinder pressure) (the integrated value or the averaged value may sometimes be used), thereby detecting the presence of knock. There are cases where the presence of knock may be detected in terms of probability instead of depending on the single signal. For instance, the presence of knock may be determined in terms of the percentage of knock events occurring in every 100 times of ignition. The ignition timing control apparatus 4 advances or retards the ignition timing in accordance with the presence or absence of knock. While the detailed constructions of the knock detecting circuit 3 and the ignition timing control apparatus 4 are well known and will not be described, it should be apparent that the detecting apparatus of this invention can be used with any types of them provided they are designed to detect the presence of knock so as to control the ignition timing.

Next, the knock detecting apparatus of this invention will be described in detail. In FIG. 2 showing a first embodiment of the invention, numeral 21 designates a magnetic vibrating member (made for example from iron, iron-nickel alloy, SUS, pure iron or the like) including a disk-shaped vibrating portion 21a having a resonant point or frequency so as to be resonant in either the knock frequency range of 4 to 10 kHz or 11 to 13 kHz. The vibrating member 21 comprises, in addition to the vibrating portion 21a, a ring-shaped vibrating portion support 21b provided along the outer periphery of the vibrating portion 21a and sufficiently great in thickness as compared with the vibrating portion 21a. The vibrating member 21 is prepared by forming a bar material into a desired shape by machining or forging and then subjecting it to cutting or press work. The vibration characteristic of the vibrating member 21 is determined by the shape, plate thickness h, length l and material of the vibrating portion 21a and its resonant frequency f can be practically replaced by $f \propto h/l^2$. The resonant frequency of the vibrating member 21 can be adjusted as desired in dependence on the number and shape of holes 21c formed through the vibrating portion 21a. The reason is that the provision of holes 21c in the vibrating portion 21a decreases its mass and the resonant frequency increases with a decrease in the mass of the portion 21a. Thus, the resonant frequency of the vibrating member 21 can be adjusted in dependence on the number and size of the holes in the portion 21a. Numeral 22 designates a bottomed housing made from a non-magnetic material and including an outer wall of substantially cylindrical shape. Numeral 23 designates a cylindrical or cup-shaped inner magnetic path received in the housing 22 and forming a part of a magnetic circuit. This magnetic path is made from a material whose eddy current loss is small, such as, FC material, SUS or ferrite so as to prevent high frequency eddy current loss. Numeral 24 designates a magnetic flux change sensing coil placed inside the inner magnetic path 23, and the coil 24 is wound on a coil bobbin 24a made from a resinous material. Numeral 25 designates a permanent magnet having a magnetic force and centrally positioned in the housing 22 and it is made from a material such as alnico. The coil bobbin 24a is positioned around the outer surface of the magnet 25. Numeral 26 designates a center magnetic path portion disposed on the upper end of the magnet 25. The magnetic path portion 26 is also made from one of the previously mentioned materials which are small in eddy current loss. Numeral 27 designates a spacer made from a magnetic material (SUS 450, FC material or the like) and disposed in contact with the inner magnetic path 23 to firmly hold together the housing 22, the inner magnetic path 23, the coil bobbin 24a, the magnet 25 and the center magnetic path portion 26. The support 21b of the vibrating member 21 is held in place by drive fitting it inside the inner wall of the housing 22 above the spacer 27, thus forming a gap between the center of the vibrating portion 21a and the center magnetic path portion 26. Numeral 28 designates a cap made from a nonmagnetic material and provided to prevent contact between lead wires 29 from the coil 25 and the vibrating member 21, and the cap 28 is disposed on the support 21b of the vibrating member 21. The lead wires 29 are taken out through the bobbin 24a and through the holes 21c in the vibrating portion 21b and holes 28a in the cap 28 without contacting the vibrating member 21 and are then fastened by soldering or caulking to inner terminals 31 of a connector 30 which is mounted in the upper end of the housing 22. Numeral 32 designates a sealing O-ring interposed between the cap 28 and the connector 30. With a spacer 33 disposed around the outer surface of the connector 30, the connector 30 is firmly held in the upper end of the housing 22 by caulking the entire periphery of the open end of the housing 22. As a result, this caulking results in a condition where a pressing force is applied to the support 21b of the vibrating member 21 via the spacer 33, the connector 30, the O-ring 32 and the cap 28. The housing 22 includes a wrench hexagonal portion 22a and a threaded portion 22b for fastening the apparatus to the engine block, and the apparatus is firmly fastened to the engine block by the threaded portion 22b. The knock-induced vibrations of the engine 1 are transmitted to the vibrating member 21 via the housing 22 and the inner magnetic path 23.

The inner magnetic path 23 is firmly drive fitted in the housing 22, and the inner bottom portion of the housing 22 is formed with a ring-shaped recess 22c so as to absorb the strain resulting from the driving fit. The housing 22 may be made from a magnetic material. In this case, however, two magnetic paths will be provided parallel to each other and the high frequency loss will be increased if the housing 22 is not made from a material which is small in high frequency loss.

With the construction described above, the operation of the knock detecting apparatus or sensor 2 will now be described. The sensor 2 is firmly attached to the engine block by the threaded portion 22b. The knock-induced engine vibrations are transmitted to the vibrating member 21 via the housing 22 and the inner magnetic path 23 vibrating its vibrating portion 21a. The vibrating portion 21a of the vibrating member 21 is positioned to face the forward end of the center magnetic path portion 26 via an air gap of about 0.1 to 0.2 mm. The magnetic flux flows in the magnetic circuit via the north pole of the magnet 25, the center magnetic path portion 26, the air gap, the vibrating member 21, the spacer 27, the inner magnetic path 23 and the south pole of the magnet 25. Thus, if the vibrating portion 21a of the vibrating member 21 vibrates, the magnetic flux flowing in the magnetic circuit changes and a voltage is induced in the detecting coil 24. This signal is taken out to the outside via the lead wires 29 and the connector 30. In this case, since the vibrating portion 21a of the vibrating member 21 has a resonant frequency in the knock frequency range, the knock detection sensitivity is improved and the sensitivity to the vibration noise components of other frequencies is decreased comparatively, thus making it possible to also detect weak knock satisfactorily.

The above-mentioned detecting apparatus also has a vibration characteristic with a damping characteristic in that the attractive force of the magnet 25 acts in the air gap and the vibrating portion 21a is attracted in one direction by this attractive force. This has an effect that as soon as the knock stops (knock occurs at the particular crank angle as mentioned previously), the attractive force acts in a direction to stop the vibration of the vibrating portion 21a and the detecting apparatus 2 generates an output only during the time interval in which the knock is present. This damping characteristic increases its effect with an increase in the magnetic force of the magnet 25.

FIGS. 3 and 4 show alternative embodiments of the vibrating member 21 used in the detecting apparatus 2 shown in FIG. 2. In the embodiment of FIG. 3, the holes 21c formed through the vibrating portion 21a each has a circular shape greater than that of the holes in FIG. 2 so as to provide a different resonant frequency. Also in the embodiment of FIG. 4, each of the holes 21c is formed into substantially a triangular shape so as to provide a different resonant frequency. By thus changing the shape or number of the holes 21c, it is possible to provide any desired resonant frequency. In FIG. 4, if, for example, the base of each of the holes 21c is increased successively as shown by a one-dot chain line and a two-dot chain line, respectively, the resonant frequency is also successively increased.

FIG. 5 shows a second embodiment of the detecting apparatus according to this invention which differs from the first embodiment of FIG. 2 mainly in that the positions of the vibrating member 21, the inner magnetic path 23, the coil 24, the magnet 25, the center magnetic path portion 26 and the spacer 27 are changed upside down and the vibrating member 21 is disposed on the inner bottom surface of the housing 22. In this second embodiment, the vibrating member 21 needs not be formed with holes therethrough for passing the lead wires 29 and thus the vibrating member 21 may be formed as shown in FIGS. 6A and 6B.

FIGS. 7A and 7B show an alternative embodiment of the vibrating member 21 used in the detecting apparatus of FIG. 5, the disk-shaped vibrating portion 21a being formed substantially at its center with a resonant frequency adjusting mass protrusion 21d which is formed integrally with the vibrating member 21 when forming the latter. In this way, the resonant frequency of the vibrating portion 21a of the vibrating member 21 can be adjusted easily by varying the mass of the mass protrusion 21b by cutting the latter, for example. The reason is that if the vibrating portion 21a is provided with an addition such as a protrusion, the mass of the vibrating portion 21a is increased and the resonant frequency decreases with an increase in the mass. Thus, by varying the mass of the mass protrusion 21d, it is possible to adjust the resonant frequency of the vibrating member 21.

Of course, both the mass protrusion 21d and the holes 21c may be provided for the purpose of adjusting the resonant frequency of the vibrating portion 21a.

Figure 8A:
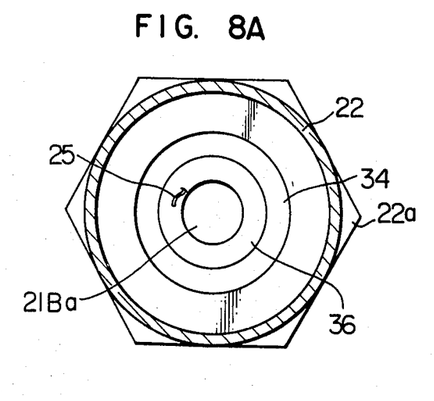
FIGS. 8A and 8B are respectively a cross-sectional view and a longitudinal sectional view showing a third embodiment of the apparatus according to this invention.
Figure 8B:
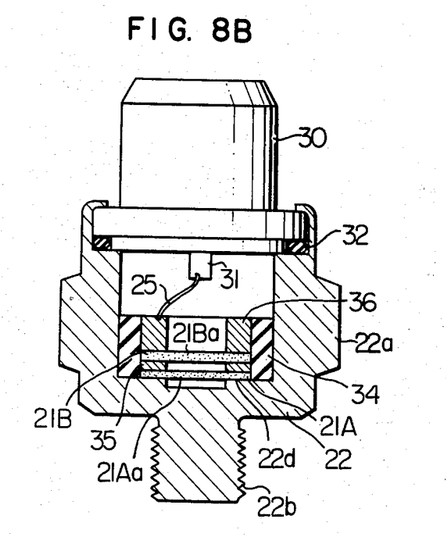
Figure 9:
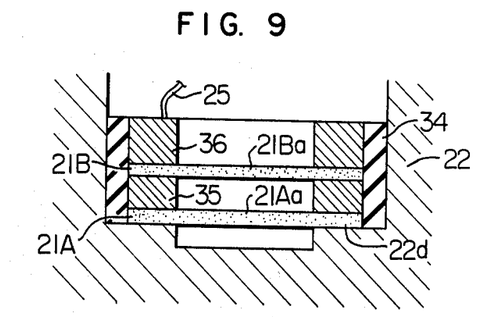
FIG. 9 is an enlarged longitudinal sectional view showing a principal part of the apparatus shown in FIGS. 8A and 8B.

FIGS. 8A and 8B show a third embodiment of the detecting apparatus according to the invention in which a ring-shaped insulating spacer 34 is drive fitted in a housing 22, and a first disk-shaped piezoelectric element 21A, a ring-shaped spacer 35 of conductive material, a second disk-shaped piezoelectric element 21B and a ring-shaped conductor spacer 36 are arranged one upon another in this order and drive fitted in the insulating spacer 34 disposed on a stepped portion 22d of the housing 22. In this detecting apparatus, although not shown, a thin film electrode is provided on each surface of each of the piezoelectric elements 21A and 21B in such a manner that the electrode on the lower surface of the first piezoelectric element 21A is grounded through the housing 22, the electrode on the upper surface of the first piezoelectric element 21A is connected to the electrode on the lower surface of the second piezoelectric element 21B through the spacer 35 and the electrode on the upper surface of the second piezoelectric element 21B is connected to the spacer 36, and the spacer 36 is connected to an inner terminal 31 of a connector 30 by a lead wire 25. As a result, the piezoelectric elements 21A and 21B are connected in series and the outputs of the piezoelectric elements 21A and 21B are taken to the outside by the lead wire 25 via the connector 30. Each of the piezoelectric elements 21A and 21B itself forms a vibrating member so that of the piezoelectric elements 21A and 21B, the portions which are on the inner diameter sides of those portions held and supported by the housing 22 and the spacers 35 and 36 form vibrating portions 21Aa and 21Ba which are vibrated by the knock-induced vibrations, and each of the piezoelectric elements 21A and 21B generates a knock vibration indicative electric output. As a result, by differing the thickness of the piezoelectric elements 21A and 21B from each other as shown in FIG. 9, two different resonant frequencies in the knock frequency ranges (4 to 10 kHz and 11 to 13 kHz) are provided and in this case the resonant frequency increases with an increase in the thickness of the vibrating member. Thus, the resonant frequency of the thicker first piezoelectric element 21A is higher than that of the thinner second piezoelectric element 21B. In this embodiment, each of the piezoelectric elements 21A and 21B is not intended to be limited to the unimorph cell construction comprising a single piezoelectric element but may be of the Bimorph cell construction in which a piezoelectric element is attached to each of the two surfaces of a center electrode.

Figure 10:
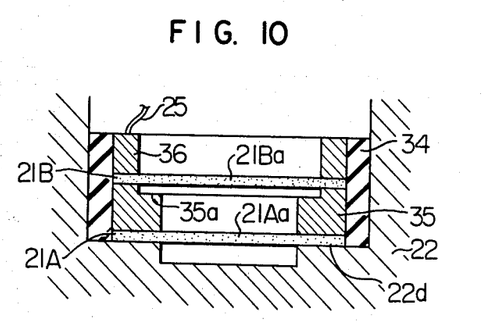
FIGS. 10 and 11 are enlarged longitudinal sectional view showing respectively the principal part of fourth and fifth embodiments of the apparatus according to this invention.

FIG. 10 shows the principal part of a fourth embodiment of the detecting apparatus according to the invention, and this embodiment differs from the embodiment of FIG. 9 in that the piezoelectric elements 21A and 21B have the same thickness and the spacer 35 is formed with a stepped portion 35a to make the vibrating portions 21Aa and 21Ba of the piezoelectric elements 21A and 21B different in diameter and hence in substantial vibrating length from each other and thereby to provide two different resonant frequencies.

Figure 11:
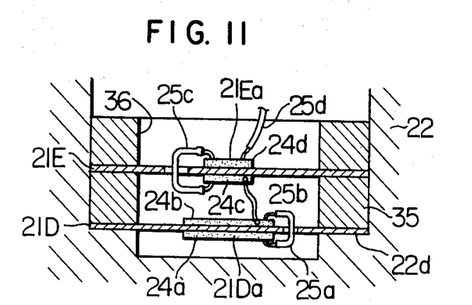

FIG. 11 shows a fifth embodiment of the detecting apparatus according to the invention which differs from the embodiment of FIG. 9 in that the piezoelectric elements 21A and 21B are respectively replaced by first and second disk-shaped vibrating members 21D and 21E made from conductive materials of the same thickness (or ones which are prepared by applying a thin film conductor to each surface of insulating sheets of ceramic, resin or the like) and piezoelectric elements 24a to 24d which are respectively applied partially to the upper and lower surfaces of the vibrating members 21D and 21E, respectively, by means of a conductive adhesive, sputtering or the like, and the spacers 35 and 36 are directly drive fitted into the housing 22. The surfaces of the piezoelectric elements 24a to 24d which are attached to the vibrating members 21D and 21E are grounded through the spacers 35 and 36 and the housing 22 and the other surfaces are each coated with a thin film electrode (not shown) such that the electrodes are interconnected by lead wires 25a to 25c and the electrode on the upper surface of the piezoelectric element 24d is connected to the inner terminal 31 of the connector 30 by a lead wire 25d. As a result, the piezoelectric elements 24a to 24d are connected in parallel with one another and thus the vibrations from vibrating portions 21Da and 21Ea of the vibrating members 21D and 21E are converted into electric signals by the piezoelectric elements 24a to 24d and delivered via the lead wire 25d. In this case, by varying the contact areas of the piezoelectric elements 24a to 24d attached to the vibrating members 21D and 21E and thus differing their masses from each other, the piezoelectric elements 24a to 24d cause the substantial masses of the vibrating portions 21Da and 21Ea of the vibrating members 21D and 21E to differ from each other and thereby to make the resonant frequencies of the vibrating portions 21Da and 21Ea different from each other. In this case, it is only necessary to provide the piezoelectric elements 24a to 24d only on one surface of the vibrating member 21D and 31E, respectively, and it is possible to vary the attached areas (or attached amounts) of the piezoelectric elements 24a to 24d of the vibrating portions 21Da and 21Ea so as to adjust the resonant frequencies of the vibrating portions 21Da and 21Ea.

Figure 12:
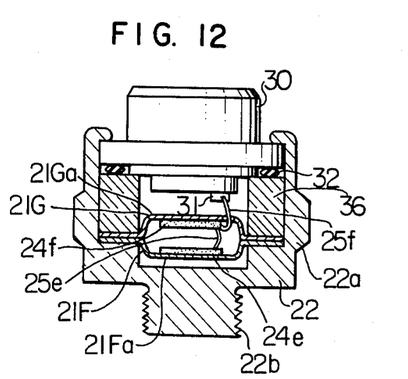
FIG. 12 is a longitudinal sectional view showing a sixth embodiment of the appartus according to this invention.

FIG. 12 shows a sixth embodiment of the detecting apparatus according to the invention which differs from the embodiment of FIG. 11 in that vibrating portions 21Fa and 21Ga of vibrating members 21F and 21G are depressed, that piezoelectric elements 24e and 24f are respectively attached to the inner surfaces of the dish-shaped vibrating members 21F and 21G and that the outer peripheral portions of the vibrating members 21F and 21G are directly secured to each other with the piezoelectric elements 24e and 24f being opposed to each other, thus eliminating the spacer 35. The piezoelectric elements 24e and 24f have their one surfaces grounded via the vibrating members 21F and 21G and the housing 22, and the thin film electrodes applied to the other surfaces of the piezoelectric elements 24e and 24f are interconnected by a lead wire 25e and are also connected to the inner terminal 31 of the connector 30 by a lead wire 25f.

While, in the embodiments shown in FIGS. 8A to 12, the two resonant frequencies are provided, the number of vibrating members (or piezoelectric elements) to be superposed may be increased to three or more so as to provide three or more resonant frequencies or alternatively the number of vibrating member (or piezoelectric elements) may be reduced to one so as to provide only one resonant frequency.

Figure 13:
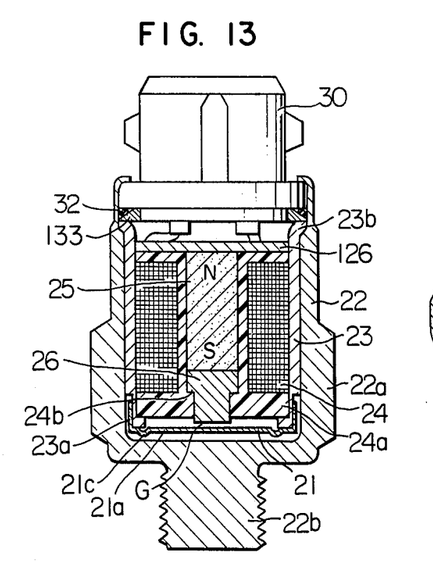
FIG. 13 is a longitudinal sectional view of a seventh embodiment of the apparatus according to this invention.
Figure 14:
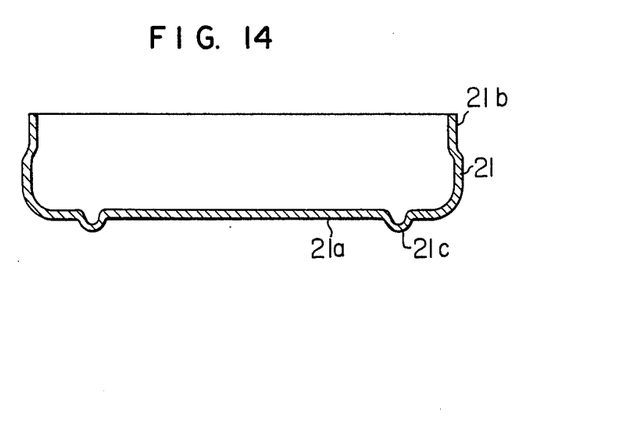
FIG. 14 is a longitudinal sectional view of the vibrating member used in the apparatus shown in FIG. 13.

FIG. 13 shows a seventh embodiment of the detecting apparatus according to the invention, in which numeral 21 designates a magnetic vibrating member having a resonant point in the knock frequency range of 5 to 10 kHz, and the vibrating member 21 comprises, as shown in FIG. 14, a disk-shaped vibrating portion 21a, a ring-band rib portion 21c formed by a depression along the outer periphery of the vibrating portion 21a and a ring-shaped drive portion 21b formed to extend vertically along the outer periphery of the rib portion 21c. In this embodiment, the vibrating member 21 is prepared by pressing magnetic material such as iron, iron-nickel alloy, stainless steel or the like material and nickel, zinc or other plating is effected in the case of a material which is subject to rusting or the like. Numeral 23 designates an inner magnetic path formed into substantially a cylindrical shape by pressing magnetic material such as iron, stainless steel or the like and including at its lower end a portion 23a adapted to be drive fitted into the vibrating member 21 and at its upper end a portion 23b adapted to be drive fitted into the housing 22. In other words, the drive portion 21b of the vibrating member 21 is preliminarily fitted firmly on the lower drive portion 23a and then the vibrating member 21 is firmly drive fitted along the inner surface of the housing 22 until it is positioned by the upper drive portion 23b. In this case, a small space is formed between the lower end of the rib portion 21c of the vibrating member 21 and the inner bottom surface of the housing 22. Numeral 126 designates an upper magnetic path made by the same pressing as the inner magnetic path 23 and drive fitted in the upper part of the magnetic path 23. Numeral 26 designates a center magnetic path whose end face on the vibrating member 21 side is shaped to face the latter so as to define therebetween a predetermined air gap G (usually on the order of 0.1 to 0.7 mm). A coil bobbin 24a is supported between the lower surface of the upper magnetic path 126 and the lower part of the inner magnetic path 23 and it includes a stepped portion 24b along the lower portion of its center opening. A magnet 25 and the center magnetic path 26 are disposed inside the coil bobbin 24a. Numeral 133 designates a ring-shaped spacer. The upper end of the housing 22 is caulked by peripheral caulking and its inside is protected from the outside air by a sealing O-ring 32. The remaining components which are designated by the same reference numerals as used in the previously described drawings serve the same or the equivalent functions.

As shown in the previously mentioned embodiments, the principal factors which determine the natural frequency of the peripherally-fixed disk-shaped vibrating member 21 are the radius, thickness and mass of the disk. To vary the radius of the disk as a means of adjusting the natural frequency is not practical, since the size of the drive portion 23a of the inner magnetic path 23 or the inner diameter of the housing 22 shown in FIG. 13 must be varied simultaneously.

To vary the thickness of the disk finely as a means of adjusting the natural frequency is also not practical, since the dimensional control of the disk thickness is difficult.

In the case of the seventh embodiment shown in FIG. 13, the means of adjusting the natural frequency of the vibrating member 21 consists of providing the band rib portion 21c over a part of the entire periphery of the vibrating portion 21a and varying the diameter of the rib portion 21c to effectively vary the radius of the vibrating portion 21a and thereby to considerably simplify the adjustment of the natural frequency.

Figure 15:
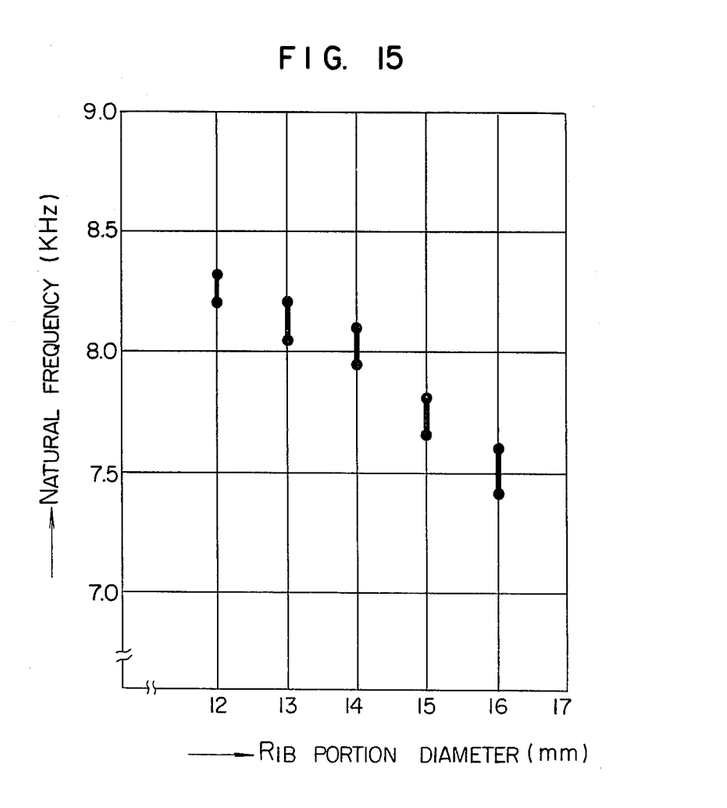
FIG. 15 is a characteristic diagram showing the measured frequency values of the vibrating member shown in FIG. 14.

FIG. 15 shows the measured values of the natural frequency obtained by using SUS 430 type stainless steel material of 0.25 mm thick and varying the diameter of the rib portion 21c. As will be seen from FIG. 15, the natural frequency can be successively varied in dependence on the diameter of the rib portion and the natural frequency of the vibrating member 21 can be adjusted as desired by selecting a suitable rib diameter.

Figure 16:
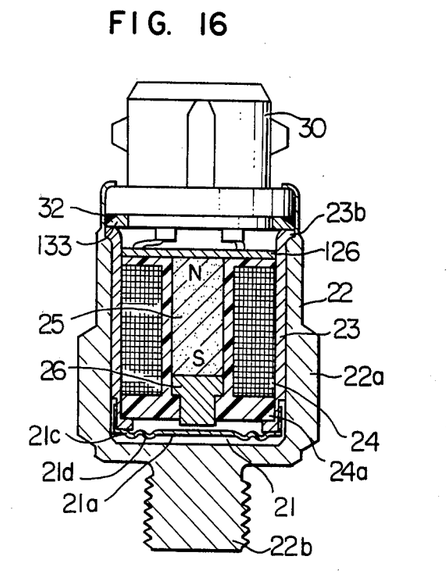
FIG. 16 is a longitudinal sectional view showing an eighth embodiment of the apparatus according to this invention.

FIG. 16 shows an eighth embodiment of the invention which is particularly applicable to cases where the disk thickness is preselected so that in case of need, another ring-band rib portion 21d is additionally provided on the inner or outer side of the ordinary rib portion 21c so as to determine the desired resonant frequency by means of the double rib structure.

Figure 17:
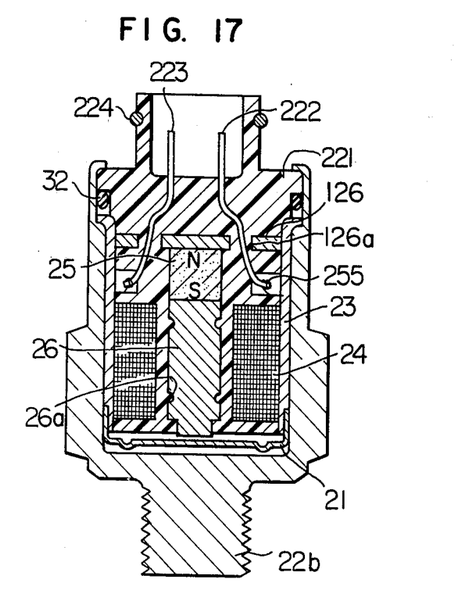
FIG. 17 is a longitudinal sectional view of a ninth embodiment of the invention which is the seventh embodiment modified for mass production purposes.

FIG. 17 shows a ninth embodiment of the invention which is designed for mass production through a modified construction of the detecting apparatus according to the seventh embodiment. The vibrating member 21 used may be of the construction shown in FIG. 13 or 16. In the Figure, like reference numerals as used in the seventh embodiment designate the same or equivalent components. The modification mainly resides in that the coil bobbin 24a and the connector 30 are in the form of an integrally formed resin component 221 in which are incorporated by molding the upper magnetic path 126 with holes 126a for passing lead wires 222 and 223 and the magnet 25. The integrally molded component 221 is drive fitted so that the outer surface of the upper magnetic path 126 is secured to the inner surface of the inner magnetic path 23. Numeral 255 designates the output terminals of the coil 24 which are fastened to the lead wires 222 and 223 by soldering, caulking or the like. Numeral 224 designates a sealing O-ring. The center magnetic path 26 is formed in its outer surface with ring-shaped recesses 26a which provide a strengthening adhesion between the magnetic path 26 and the molded component 221.

Figure 18:
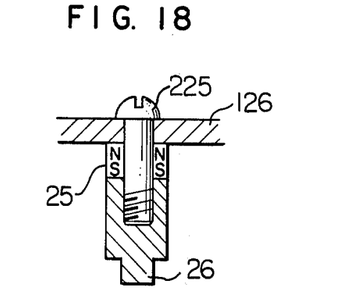
FIG. 18 is a longitudinal sectional view showing the construction of a principal part of the apparatus shown in FIG. 17.

The remainder including the vibrating member 21 are arranged so that they are protected from the outside air by the O-ring 32 in the same manner as the seventh embodiment. Also in this embodiment, the upper magnetic path 126, the center magnetic path 26 and the magnet 25 are held in a reinforcing manner in the molded resin material of the component 221 and the embodiment has a sufficient durability under the ordinary engine operating conditions giving rise to no difficulty. However, in the case of vehicles requiring more severe operating conditions, as shown in FIG. 18, a hole may be formed in the upper magnetic path 126, the magnet 25 and the center magnetic path 26 so as to join them together by a screw 225 of nonmagnetic material (or magnetic material may be used although it decreases the magnetic force) or by caulking prior to the molding of the component 221 around them, thus ensuring a sufficient strength. This construction has the effect of simplifying the assemblage and reducing the manufactureing cost.

While, in the embodiments described so far, the invention is applied to the apparatus of the type employing magnetic vibration-electricity conversion means, this invention is not intended to be limited to these means.

Figure 19A:
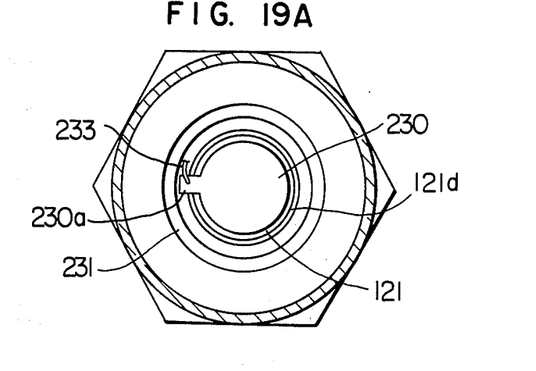
FIGS. 19A and 19B are respectively a cross-sectional view and a longitudinal sectional view of a tenth embodiment incorporating the invention in a detecting apparatus based on the principle of the piezoelectric type.
Figure 19B:
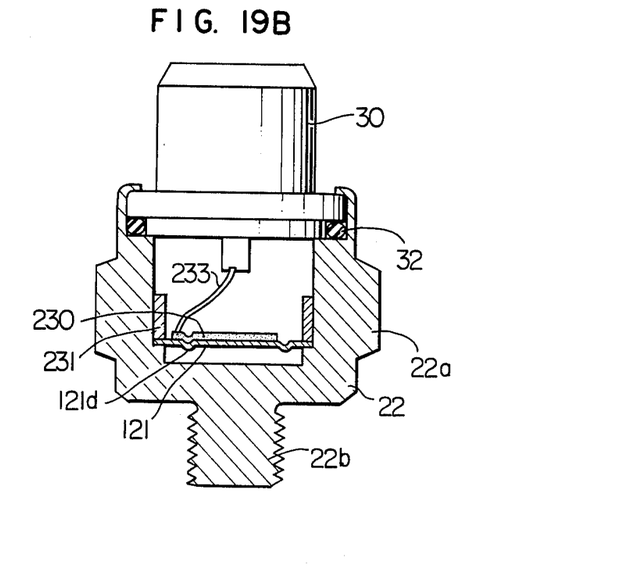

FIGS. 19A and 19B show a tenth embodiment of the invention which is applied to a piezoelectric type detecting apparatus. In the Figures, like reference numerals as used in the seventh embodiment designate to same or the equivalent components. This embodiment differs from the embodiments of FIG. 13 or 16 mainly in that the magnetic vibrating member 21 is replaced with a piezoelectric element 230 applied partially to the surface of a disk-shaped conductive vibrating member 121 by a conductive adhesive, by a sputtering technique or by some other adhesive arrangement and that vibrating member 121 is directly force fitted and held inside the housing 22 by means of a metallic spacer 231.

The vibrating member 121 is formed with a ring-band rib portion 121d and the piezoelectric element 230 is positioned inwardly of the rib portion 121d. The vibrating member 121 is grounded via the spacer 231 and the housing 22, and applied to the other surface of the piezoelectric element 230 is a thin film electrode (not shown) which is connected to the connector 30 by a lead wire 233.

In the embodiment shown in FIGS. 19A and 19B, in order to prevent the natural frequency of the vibrating member 121 from varying due to the connection of the lead wire 233, a portion 230a of the piezoelectric element 230 extends beyond the rib portion 121d and the lead wire 233 is connected to the piezoelectric element externally of the rib portion 121d. However, it is needless to say that the lead wire 233 can be connected to the piezoelectric element 230 internally of the rib portion 121d provided that the wire diameter of the lead wire 233 is fine enough and its effect is negligible.

In the embodiment of FIGS. 19A and 19B, the vibration of the vibrating member 121 causes the piezoelectric element 230 to directly generate an electric signal.

While, in the embodiments described above, the rib portions 21c, 21d and 121d are each formed into a ring (circular) band shape, the shape of the rib portion is not limited to the ring (circular) shape provided that the frequency can be adjusted. For instance, the rib portion may of course be formed into an oval or square band shape. Further, the shape of the rib portion is not limited to the endless shape and it may be formed into a partially-broken circular shape or only a part of a circular shape provided that the rib portion is of band shape.

We claim:

1. A knock detecting apparatus for an internal combustion engine comprising:
    at least one vibrating element having a resonant frequency within a knock frequency range of said engine to be detected, said vibrating element including a disk-shaped vibrating portion, said vibrating portion including at least one rib portion along an outer periphery of said vibrating portion for adjusting the natural frequency thereof by changing the radius of said rib portion,
    means for holding the outer peripheral portion of said vibrating element substantially over the entire periphery thereof; and
    vibration-electricity conversion means, coupled to said vibrating means, for generating an electric signal corresponding to the vibration of said vibrating portion of said vibrating element.

2. An apparatus according to claim 1, wherein said outer peripheral portion of said vibrating element held by said holding means is greater in thickness than said vibrating portion.

3. An apparatus according to claim 1, wherein said vibrating portion includes a plurality of holes for adjusting the natural frequency thereof.

4. An apparatus according to claim 1, wherein said vibrating portion includes a mass addition portion for adjusting the natural frequency thereof.

5. An apparatus according to claim 4, wherein said mass addition portion is integral with said vibrating portion and greater in thickness than the remainder of said vibrating portion.

6. An apparatus according to claim 4, wherein said vibration-electricity conversion means includes piezoelectric means, and wherein said mass addition portion is the piezoelectric means attached to said vibrating portion.

7. An apparatus according to claim 1, wherein said vibration-electricity conversion means includes magnetic flux sensing means for sensing magnetic flux varying in response to vibrations of said vibrating portion to generate an electric output.

8. An apparatus according to claim 1, wherein said vibration-electricity conversion means includes piezoelectric element.

* * * * *